United States Patent Office 2,779,801
Patented Jan. 29, 1957

2,779,801

ALUMINUM ALKOXIDE REDUCTION OF ALPHA METHYLIDENE ALKANALS

Harry De V. Finch and Aldo De Benedictis, Berkeley, Calif., assignors to Shell Development Company, Emeryville, Calif., a corporation of Delaware No Drawing. Application December 4, 1953, Serial No. 396,311

13 Claims. (Cl. 260—638)

This invention relates to a process for the production of unsaturated primary alcohols from the corresponding aldehydes. More particularly, the present invention relates to a process for the selective reduction of alpha-methylidene alkanals whereby the formyl group is converted to a primary carbinol group without concomitant reduction of the ethylenic linkage of the alpha-methylidene group. It deals especially with a new method for carrying out such reductions in an efficient and economical manner to obtain high yields of beta,gamma-ethylenic primary alcohols.

It is known in the prior art that aldehydes can be reduced to alcohols by reaction with alcoholates derived from hydroxides of various metals, particularly those of groups I, II and III of the periodic table. Aluminum alkoxides have been found to be an especially suitable type of alcoholate for this purpose. The reaction has been used quite successfully for the reduction of a number of different types of saturated and unsaturated aldehydes in the laboratory where economy in consumption of reagents is of secondary importance to convenience of operation on a small scale. In the application of the procedure to the reduction of aliphatic aldehydes, particularly unsaturated aldehydes, it has been found necessary in the prior methods of operation to use a substantial excess of aluminum alkoxide in order to minimize side reactions leading to the formation of high boiling products. Excess alkoxide of the order of about 50% to 100% or more, over the stoichiometric proportion of one-third mole of aluminum alkoxide per mole of aldehyde, has been recommended as most desirable. This high consumption of expensive aluminum alkoxide has made the procedure quite costly. In so far as we are aware, there has been described in the prior art no method of carrying out such reductions which is economically feasible for the commercial scale conversion of alpha-methylidene alkanals to the corresponding alcohols.

An important object of the present invention is to eliminate the foregoing and other disadvantages of the prior methods of reduction by means of aluminum alcoholates. A method for selectively reducing the formyl group of an alpha-methylidene alkanal to produce the corresponding beta-methylidene alkanol forms another object of the invention. A further object is to provide a practical method for the commercial scale manufacture of ethylenic alcohols by reduction of the corresponding alpha methylidene alkanals using a saturated secondary alcohol as the reducing agent in the presence of a catalytic amount of aluminum alcoholate. A special object is the provision of an economical method for the catalytic reduction in this way of acrolein and its alpha-methyl and alpha-chloro derivatives using aluminum secondary alkoxide as the catalyst. A further object is to provide a method of reduction of this type carried out under mild conditions requiring only relatively inexpensive equipment for large scale operation. Still other objects and advantages of the invention will be apparent from the following description.

It has been discovered in accordance with the present invention that alpha-methylidene alkanals can, as a class, be reduced successfully to the corresponding ethylenic primary alcohols in high yields and conversions by reaction with a secondary alcohol in the presence of only catalytic amounts of aluminum alcoholate of a secondary alcohol, that is, amounts less than half the stoichiometric requirement for reduction with the aluminum alcoholate. Amounts of secondary alcohol aluminum alcoholate of the order of about 0.02 to 0.14 mole per mole of alpha-methylidene alkanal are effective.

The alpha-methylidene alkanals used as starting materials in the new process contain a vinylidene group in conjugate relationship to the unsaturated linkage of the carbonyl group. This structural arrangement makes them extremely sensitive compounds. They are known to polymerize much more readily than corresponding aldehydes having the alpha,beta-ethylenic bond removed from the end of the chain. In view of the prior teachings respecting the need for large amounts of aluminum alkoxide to suppress side reactions during reduction of these less easily polymerizable aldehydes, it was unexpected to find that these highly polymerizable alpha-methylidene alkanals can be converted in high yields to the corresponding beta-methylidene alkanols by selective reduction with a secondary alcohol in the presence of only catalytic amounts of an aluminum alkoxide. By means of the present process, acrolein can be reduced very economically to allyl alcohol in high yields. Methacrolein, when reduced according to the process of the invention, is converted to methallyl alcohol with only negligible, if any, amounts of other products of reduction. The alpha-methylidene alkanals which can be successfully employed in the new process have the structure represented by the formula

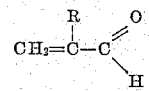

wherein R represents a hydrogen or halogen atom ar a lower saturated hydrocarbon radical, preferably an alkyl group such that the aldehyde contains from 3 to 10 carbon atoms per molecule. Acrolein, methacrolein, alpha-ethylacrolein, alpha-isopropylacrolein, alpha-chloroacrolein, alpha-chloromethylacrolein, and their near higher homologues having the above structure, comprise the alpha-methylidene aldehydes which are used as starting materials for reduction according to the invention.

The secondary alcohols which are employed as reducing agents in the new process are converted to the corresponding ketones. From the standpoint of convenience, availability, and cost, the lower unsubstituted secondary aliphatic alcohols are especially suitable, although the operable scope of the invention is not limited thereto. For example, cyclic secondary alcohols having the hydroxyl group bonded to a ring carbon atom, or secondary alcohols containing a benzenoid or other type of ring in the molecule, can be used. The alcohol can be substituted to a minor extent by inert substituents which do not alter the essentially hydrocarbon nature of the secondary radical to which the hydroxyl group is linked. However, it is generally preferred to employ an unsubstituted secondary alcohol, that is, one composed of the hydroxyl group and a hydrocarbon radical to which the hydroxyl is bonded. Secondary alcohols having 3 to 18 carbon atoms per molecule are suitable. Representative secondary alcohols which have been found to be useful as reducing agents include, among others, isopropyl alcohol, secondary butyl alcohol, secondary amyl alcohol, diethyl carbinol, methyl isobutyl carbinol, 5-methyl-3-heptanol, diisobutyl carbinol, dodecanol-2, methyl allyl carbinol, cyclohexanol, methyl cyclohexyl carbinol, phenyl methyl carbinol, and the like, and their homologs and analogs. The saturated alcohols are especially useful.

As a rule, it is preferred to employ as catalyst the aluminum alcoholate corresponding to the secondary alcohol used as reducing agent since in this way separation and recovery of the reaction products is usually simplified. It is feasible, however, to use aluminum alcoholates derived from other secondary alcohols as the catalyst. Preferred catalysts are the aluminum alkoxides from secondary aliphatic alcohols having 3 to 10 carbon atoms per molecule. The catalyst can be prepared in the known manner by dissolving metallic aluminum in the chosen secondary alcohol or mixture of such alcohols. One convenient method is to dissolve the aluminum in an excess of the secondary alcohol and employ the resulting solution of aluminum secondary alcoholate as catalyst for the reduction. The alcoholate can be recovered and purified by distillation before use, however.

The reaction as carried out with the previously indicated catalytic amounts of aluminum secondary alcoholate, between about 0.02 and 0.14 mole per mole of aldehyde present, can be conducted under widely different conditions. Temperatures from room temperature to the boiling temperature of the reaction mixture under the operating pressure can be used, although it is desirable in order to avoid long reaction times to employ temperatures of at least 35° C. and, in order to suppress side reactions, temperatures below 80° C. In order to promote high conversions of alpha-methylidene alkanal, it is advantageous to use at least an equal amount relative thereto on a molar basis of the secondary alcohol being employed as the hydrogen transfer agent and, more preferably, a molar excess of such alcohol should be present. However, for best results, it is desirable to regulate the reaction conditions so as to maintain the reaction variables within controlled critical limits. Important among these is the control of the ratio of secondary alcohol used as reducing agent to alpha-methylidene alkanal being reduced. Control of temperature and time of reaction is also important in order to achieve the maximum yields and conversions when employing the catalytic amounts of aluminum secondary alkoxides previously indicated. The particular combination of operating conditions which will be most advantageous for the reduction will depend upon the particular secondary alcohol chosen for use as the reducing agent and for formation of the aluminum alcoholate catalyst. In any case, however, the following ranges will be found to be most suitable:

| | |
|---|---|
| Mole ratio of aluminum secondary alkoxide to alpha-methylidene alkanal | 0.04 to 0.14 |
| Mole ratio of secondary alcohol reducing agent to alpha-methylidene alkanal | 1.05 to 2.5 |
| Reaction temperature | 40° C. to 80° C. |
| Reaction time (minutes) | 1 to 60 |

Typical of the narrower limits within the foregoing critical ranges which are preferred with particular combinations of reactants are the following which give the best results in the reduction of acrolein with the indicated alcohols when employing aluminum alkoxides derived from the same secondary alcohol as catalyst:

| | Isopropyl Alcohol | Secondary Butyl Alcohol |
|---|---|---|
| Mole ratio of aluminum secondary alkoxide to acrolein | 0.06 to 0.14 | 0.04 to 0.08 |
| Mole ratio of secondary alcohol to acrolein | 1.2 to 2.5 | 1.15 to 1.5 |
| Reaction temperature ° C. | 40 to 60 | 40 to 60 |
| Reaction time (minutes) | 10 to 60 | 1 to 60 |

It has been found that, contrary to the situation with other types of aldehydes, the equilibrium constant for the reaction between alpha-methylidene alkanals and lower secondary aliphatic alcohols is so high at the preferred operating temperatures that substantially complete conversion of the aldehyde to the corresponding beta-methylidene alkanol is readily obtained without distillation of either of the reaction products during the reaction. However, depending upon the relative boiling points of the components of the mixture, one can, if desired, remove one or both of the reaction products as they are formed in the reaction. Atmospheric pressure or higher or lower pressures can be used in the process.

The reaction can be carried out batchwise, intermittently or continuously. In any case, since water has a pronounced deleterious effect on the reaction when using only small catalytic amounts of aluminum alcoholate in accordance with the invention, it is highly desirable to employ anhydrous reactants and to protect the reaction system from any contamination with moisture. One suitable method of batch reaction is to heat to the desired reaction temperature a solution of the chosen aluminum alcoholate catalyst in the secondary alcohol being employed as reducing agent and then add the alpha-methylidene alkanal to the catalyst solution with vigorous stirring to insure thorough mixing while maintaining the temperature within the desired range. At the end of the reaction period water can be added to destroy the catalyst and prevent further reaction and the products can be recovered by distillation.

The process can be carried out continuously by feeding a solution of the catalyst in part of the secondary alcohol and a solution of the alpha-methylidene alkanal in the remaining amount of secondary alcohol required to give the desired ratio of alcohol to aldehyde through a mixing nozzle or other suitable device which will insure prompt, uniform mixing, and conducting the mixture through a reactor provided with temperature control means. A jacketed reaction tube which may, for instance, be in the form of a coil or, more advantageously, a vertical pipe having an axial stirrer, is suitable. The flow rate through the reactor is adjusted so as to provide the desired reaction time and the effluent reacted mixture is continuously run into water to destroy the catalyst, after which the products are separated by distillation. In addition to the beta-methylidene alkanol formed from the alpha-methylidene alkanal being reduced, a ketone is produced from the secondary alcohol employed as hydrogen donor in the process. For example, when acrolein is reacted with isopropyl alcohol according to the process of the invention, allyl alcohol and acetone are produced; similarly, the reaction of methacrolein with secondary butyl alcohol produces methallyl alcohol and methyl ethyl ketone, while from alpha-chloracrolein and methyl isobutylcarbinol beta-chlorallyl alcohol and methyl isobutyl ketone are obtained. The ketones which are thus formed are valuable by-products which can be separated from the desired primary ethylenic alcohols and marketed. Alternatively, they can be hydrogenated by known methods in a separate step to convert them back to the corresponding secondary alcohols which can then be recycled to the process of the invention.

The following examples are presented to illustrate in more detail certain of the numerous possible specific embodiments of the invention and show some of its advantages, without, however, limiting the invention as it is defined in the appended claims.

Example I

The effect of various amounts of aluminum secondary butoxide catalyst in the reaction of acrolein with secondary butyl alcohol to produce allyl alcohol and methyl ethyl ketone is shown by the following results obtained in batch reactions carried out at 50° C. using a mole ratio of secondary butyl alcohol to acrolein of 1.26. A solution of the aluminum secondary butoxide catalyst in half of the secondary butyl alcohol was heated to the reaction temperature in a stirred reactor provided with a reflux condenser, and a solution of acrolein in the remainder of the secondary butyl alcohol was then added. After 30 minutes' reaction, about 7.5 pounds of water per pound of starting aluminum secondary butoxide was added to the reaction mixture to stop the reaction, and the mixture was distilled in a 20-plate column to take off three overhead fractions (cut 1, boiling up to 73° C. and containing chiefly acrolein, methyl ethyl ketone and water; cut 2, boiling 73° C.–80° C. and containing mainly methyl ethyl ketone, allyl alcohol, secondary butyl alcohol and water; cut 3, boiling 80° C.–99° C. and containing mainly allyl alcohol, secondary butyl alcohol and water) from a bottoms product consisting of water, aluminum hydroxide and a small amount of polymer.

| Moles of Aluminum Secondary Butoxide Per Mole of Acrolein | Acrolein Conversion (Percent) | Allyl Alcohol Yield (Percent) |
|---|---|---|
| 0.020 | 59.4 | 81.6 |
| 0.041 | 88.4 | 90.8 |
| 0.051 | 93.9 | 96.9 |
| 0.071 | 98.1 | 92.8 |

*Example II*

Acrolein was reacted with isopropyl alcohol in the presence of various amounts of aluminum isopropoxide using a procedure similar to that of Example I, except that the catalyst was prepared by dissolving aluminum in the entire amount of isopropyl alcohol (2 moles per mole of acrolein) employed in the process and the acrolein was added to the catalyst solution without previous solution in alcohol. In two series of tests at different reaction times, the following results were obtained:

| Moles of Aluminum Isopropoxide Per Mole of Acrolein | Reaction Time | | | |
|---|---|---|---|---|
| | 30 Minutes | | 60 Minutes | |
| | Conversion of Acrolein to Allyl Alcohol | Yield of Allyl Alcohol | Conversion of Acrolein to Allyl Alcohol | Yield of Allyl Alcohol |
| 0.05 | 71.5 | 87.5 | 78.6 | 84.2 |
| 0.065 | 78 | 87.0 | | |
| 0.075 | 87.3 | 91.3 | 90.8 | 92.1 |
| 0.10 | 90.5 | 92.0 | 89.0 | 89.4 |

*Example III*

The effect of varying the ratio of secondary alcohol to alpha-methylidene alkanal is shown in the following results obtained in reacting acrolein with secondary butyl alcohol as described in Example I, using a mole ratio of aluminum secondary butoxide catalyst to acrolein of 0.05, a reaction time of 30 minutes and a temperature of 50° C.

| Moles of Secondary Butyl Alcohol Per Mole of Acrolein | Acrolein Conversion (Percent) | Yield of Allyl Alcohol Based on Acrolein Converted (Percent) |
|---|---|---|
| 0.77 | 81.5 | 86.1 |
| 1.02 | 92.6 | 90.8 |
| 1.06 | 96.6 | 91.7 |
| 1.26 | 93.9 | 96.9 |
| 1.52 | 90.9 | 94.2 |

*Example IV*

The effect of temperature on the reaction of secondary butyl alcohol with acrolein (mole ratio 1.15–1.25) in the presence of 0.04 to 0.05 mole of aluminum secondary butoxide catalyst per mole of acrolein is shown by the following results of tests carried out as described in Example I using a reaction time of 60 minutes.

| Reaction Temperature, ° C. | Acrolein Conversion (Percent) | Yield of Allyl Alcohol Based on Acrolein Converted (Percent) |
|---|---|---|
| 0 [1] | 77.1 | 83.2 |
| 25 | 88.1 | 83.9 |
| 40 | 95.9 | 90.8 |
| 50 | 94.2 | 91.8 |
| 60 | 93.2 | 88.0 |
| 72 [2] | 92.1 | |

[1] 2 hrs. reaction time.
[2] 6 min. reaction time.

*Example V*

The reduction of acrolein with secondary butyl alcohol was carried out continuously using a jacketed glass tube of 20 mm. diameter having a free volume of 60 ml. Heated oil was pumped through the jacket to maintain a reaction temperature of 50 C. The reactor was provided with an axial stirrer, two feed inlets at the bottom and a product outlet at the top. Into one inlet was fed the acrolein dissolved in 50% of the secondary butyl alcohol while a solution of secondary butoxide catalyst in the remainder of the secondary butyl alcohol was fed through the other bottom inlet, the rates of feed being controlled to maintain the reaction time at 11 minutes. After reaction the catalyst was continuously removed from the mixture by treating the reactor effluent with water. In typical runs the results were as follows:

| | | |
|---|---|---|
| Mole ratio of aluminum secondary butoxide to acrolein in the feed | 0.057 | 0.049 |
| Mole ratio of secondary butyl alcohol to acrolein in the feed | 1.85 | 1.15 |
| Acrolein conversion percent | 82.6 | 88.4 |
| Allyl alcohol yield do | 91.0 | 96.5 |

*Example VI*

Acrolein was reduced by batchwise reaction as described in Example I but employing diethyl carbinol as the reducing agent and the corresponding aluminum alkoxide, in the proportion of 0.075 mole per mole of acrolein, as catalyst. At 50° C. and a 30-minute reaction period with 1.31 moles of diethyl carbinol per mole of acrolein, a yield of allyl alcohol of 89.2%, based on the acrolein converted, was obtained at an 86.6% conversion of the acrolein fed.

*Example VII*

Aluminum foil was dissolved in hot, excess methyl isobutyl carbinol containing about 0.02% of mercuric chloride, using 11.1 moles of the alcohol per atom of aluminum. A solution of acrolein in methyl isobutyl carbinol (0.62 mole per mole of acrolein) was added to the resulting aluminum alkoxide solution to form a reaction mixture containing 0.076 mole of aluminum alkoxide catalyst and 1.24 moles of secondary alcohol per mole of acrolein. In 30 minutes' reaction at 50° C. a 90.4% conversion of the acrolein fed and an 87.7% yield of allyl alcohol on acrolein reacted were obtained.

*Example VIII*

Freshly distilled aluminum secondary butoxide was dissolved in diisobutyl carbinol and the mixture heated to effect exchange of diisobutyl carbinol for the combined secondary butyl alcohol. The secondary butyl alcohol formed was removed by fractionation and the resulting solution of aluminum alkoxide catalyst in diisobutyl carbinol was used for reduction of acrolein. Employing 0.077 mole of aluminum alkoxide catalyst per mole of acrolein and 1.29 moles of diisobutyl carbinol per mole of acrolein, a yield of allyl alcohol of 87%, based on the acrolein reacted, was obtained at 92.1% conversion of the acrolein fed in 30 minutes' reaction at 50° C.

Example IX

Following the method of Example VII, 5-methyl-3-heptanol was reacted with acrolein using 1.34 moles of the secondary alcohol and 0.08 mole of the aluminum alkoxide therefrom per mole of acrolein. In 30 minutes' reaction at 50° C., a 93% yield of allyl alcohol was obtained at 100% conversion of the acrolein fed.

Example X

Using the method of Example XII, methacrolein was reduced to methallyl alcohol by reaction with secondary butyl alcohol (1.24 moles per mole of methacrolein) using 0.1 mole of aluminum secondary butoxide per mole of methacrolein as catalyst. At 50° C. and a reaction time of 30 minutes, a yield of methallyl alcohol of 94% was obtained at a methacrolein conversion of 82%.

Under similar conditions an equally good yield and conversion are obtained in the reduction of alpha-chloroacrolein to beta-chloroallyl alcohol by reaction with secondary butyl alcohol in the presence of aluminum secondary butoxide catalyst.

Example XI

The desirability of employing feed stocks which are as free from water as possible is shown by the following results obtained in reducing acrolein to allyl alcohol by reaction with anhydrous isopropyl alcohol (2 moles per mole of acrolein) in the presence of catalytic amounts of aluminum isopropoxide. The tests were carried out at 50° C. using a reaction time of 60 min.

| Water Content of Acrolein | Moles of Aluminum Isopropoxide Per Mole of Acrolein | Acrolein Reacted (Percent of Acrolein Fed) | Allyl Alcohol Yield (Percent of Acrolein Reacted) |
|---|---|---|---|
| 0.006 | 0.075 | 98.6 | 92.1 |
| 0.017 | 0.075 | 87.1 | 77.1 |
| 0.017 | 0.075 | 83.5 | 66.4 |
| 0.006 | 0.10 | 98.4 | 92.0 |
| 0.017 | 0.10 | 82.1 | 75.0 |

Example XII

Anhydrous alpha-ethylacrolein reacted with isopropyl alcohol, in the presence of 0.07 mole of aluminum isopropoxide per mole of alpha-ethylacrolein at 50° C. and a reaction time of 45 minutes using 2 moles of isopropyl alcohol per mole of alpha-ethylacrolein, gives a yield of beta-ethylallyl alcohol of about 94% on the aldehyde reacted at an alpha-ethylacrolein conversion of about 93%.

We claim as our invention:

1. A process for the production of ethylenic alcohol which comprises contacting a lower alpha-methylidene alkanal of 3 to 10 carbon atoms per molecule and secondary alcohol with a catalytic amount, between about 0.02 and 0.14 mole per mole of aldehyde present, of aluminum alcoholate derived from secondary alcohol of 3 to 18 carbon atoms per molecule, at a temperature of from about 30° C. to about 80° C. at which the reaction products are in the liquid phase.

2. The process defined by claim 1 in which the secondary alcohol is a secondary alkanol of 3 to 10 carbon atoms per molecule and the aluminum alcoholate is the aluminum alkoxide corresponding thereto.

3. The process defined by claim 2 in which the secondary alcohol is isopropyl alcohol.

4. The process defined by claim 2 in which the secondary alcohol is secondary butyl alcohol.

5. The process defined by claim 2 in which the alpha-methylidene alkanal is acrolein.

6. A process for the production of a lower 2-alkenol which comprises contacting a lower alpha-methylidene alkanal of 3 to 10 carbon atoms per molecule and an excess relative thereto on a molar basis of secondary alkanol having 3 to 18 carbon atoms per molecule with a catalytic amount, between 0.04 and 0.14 mole per mole of aldehyde present, of aluminum secondary alkoxide corresponding to said secondary alkanol at a temperature between 40° C. and 60° C. at which the reaction mixture is maintained in the liquid state.

7. The process defined by claim 6 in which said secondary alkanol is present in a ratio of 1.05 to about 3.0 moles per mole of aldehyde present.

8. The process defined by claim 7 in which the alpha-methylidene alkanal is selected from the group consisting of acrolein and methacrolein.

9. The process defined by claim 8 in which the alpha-methylidene alkanal is methacrolein.

10. A process for the production of a lower 2-alkenol which comprises contacting a lower alpha-methylidene alkanal of 3 to 10 carbon atoms per molecule and 1.05 to about 2.5 moles per mole of said alkanol of a secondary alkanol having 3 to 10 carbon atoms per molecule with a catalytic amount, between 0.04 and 0.14 mole per mole of aldehyde present, of aluminum alcoholate derived from secondary saturated aliphatic alcohol of 3 to 18 carbon atoms per molecule as essentially the sole reactants, at a temperature of from about 30° C. to about 80° C. at which the reaction products are in the liquid phase, for a period of about 1 to 60 minutes, adding an aqueous medium to the mixture to stop the reaction and recovering the 2-alkenol corresponding to said alpha-methylidene alkanal so produced.

11. A process for the production of allyl alcohol which comprises contacting acrolein and an excess relative thereto on a molar basis of a lower secondary alkanol with a catalytic amount, between 0.04 and 0.14 mole per mole of aldehyde present, of aluminum secondary alkoxide corresponding to said secondary alkanol as essentially the sole reactants at a temperature between 40° C. and 60° C. at which the reaction mixture is maintained in the liquid state for a period of about 10 to 120 minutes and recovering allyl alcohol from the resulting mixture.

12. The process defined by claim 11 in which the secondary butyl alcohol present in a ratio of 1.15 to 1.5 moles per mole of aldehyde, the aluminum secondary butoxide catalyst is present in an amount of 0.04 to 0.08 mole per mole of aldehyde present, and the reaction period is 1 to 30 minutes.

13. The process defined by claim 11 in which the secondary alkanol is isopropyl alcohol present in a ratio of 1.2 to 2.5 moles per mole of aldehyde with 0.06 to 0.14 mole of aluminum isopropoxide per mole of aldehyde.

References Cited in the file of this patent

UNITED STATES PATENTS 2,713,074     Kearby     July 12, 1955

OTHER REFERENCES

Ser. No. 376,926, Wagner (A. P. C.), published July 13, 1943.

Adkins et al.: J. A. C. S., vol. 71 (1949) pp. 3622–9.

Johnson et al.: Chemistry & Industry (1951), pp. 380–4.

Scipioni et al.: Gazzetta Chimica Ital., vol. 81 (1951), pp. 654–63.